Oct. 10, 1961 R. W. BROWN 3,003,630
APPARATUS FOR SORTING RESISTORS AND CONTROL CIRCUITRY
Filed April 26, 1960 5 Sheets-Sheet 1
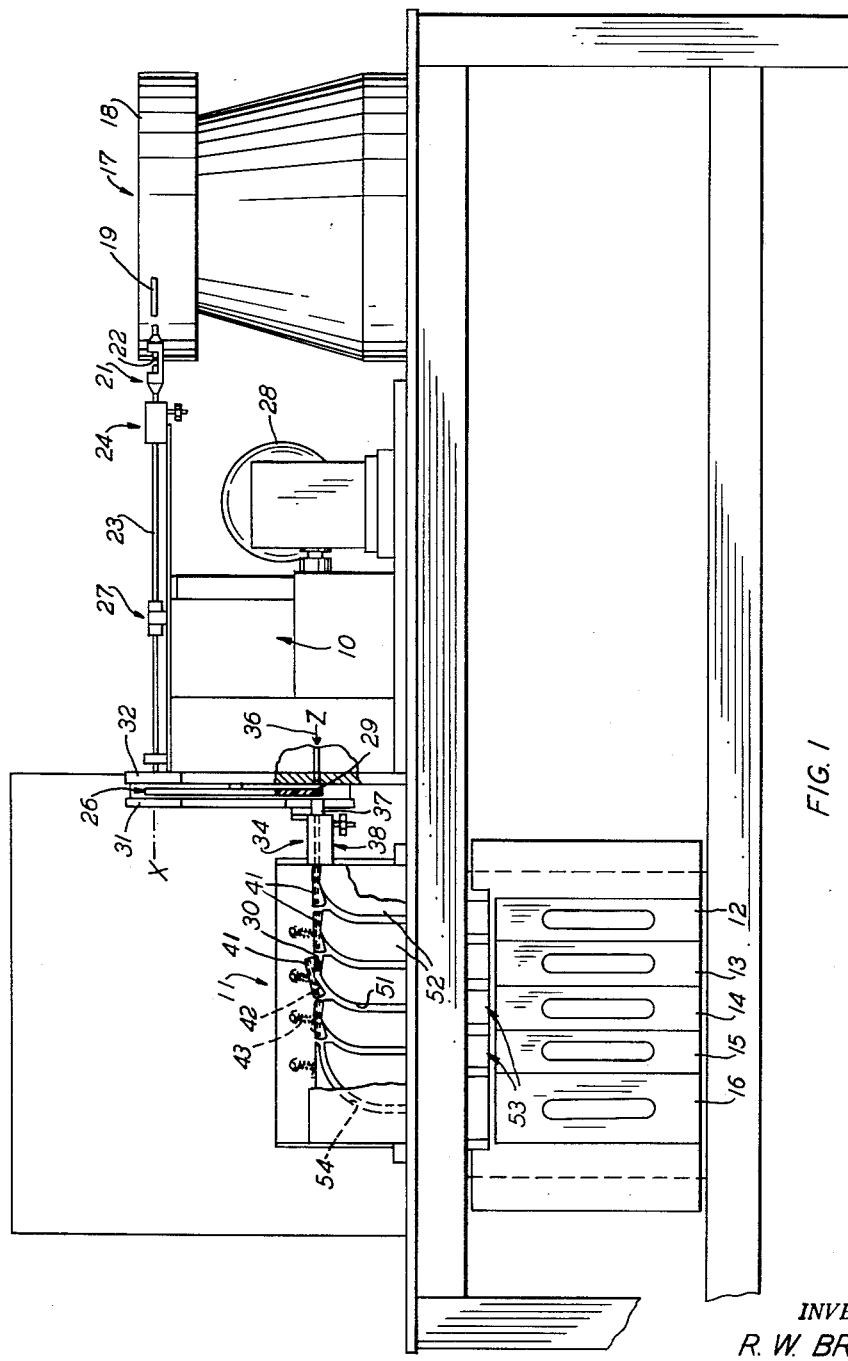
INVENTOR.
R. W. BROWN
BY
J. J. Landis
ATTORNEY Oct. 10, 1961    R. W. BROWN    3,003,630
APPARATUS FOR SORTING RESISTORS AND CONTROL CIRCUITRY
Filed April 26, 1960    5 Sheets-Sheet 2
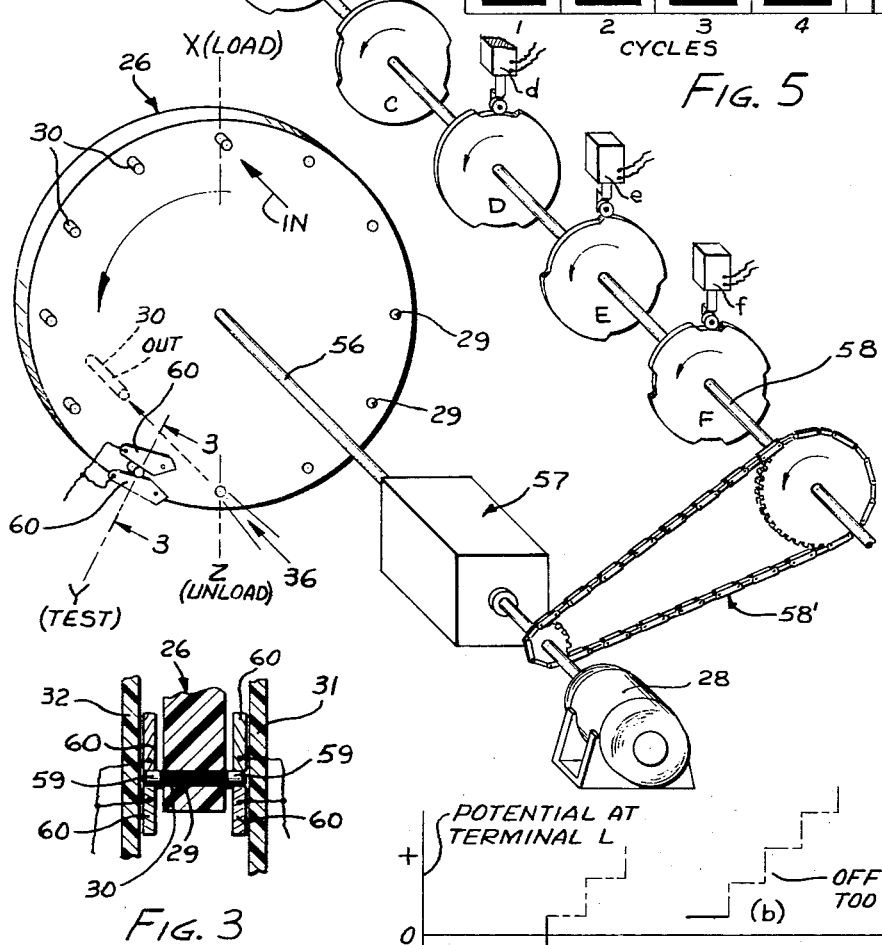
INVENTOR
R. W. BROWN
BY J. L. Landis
ATTORNEY

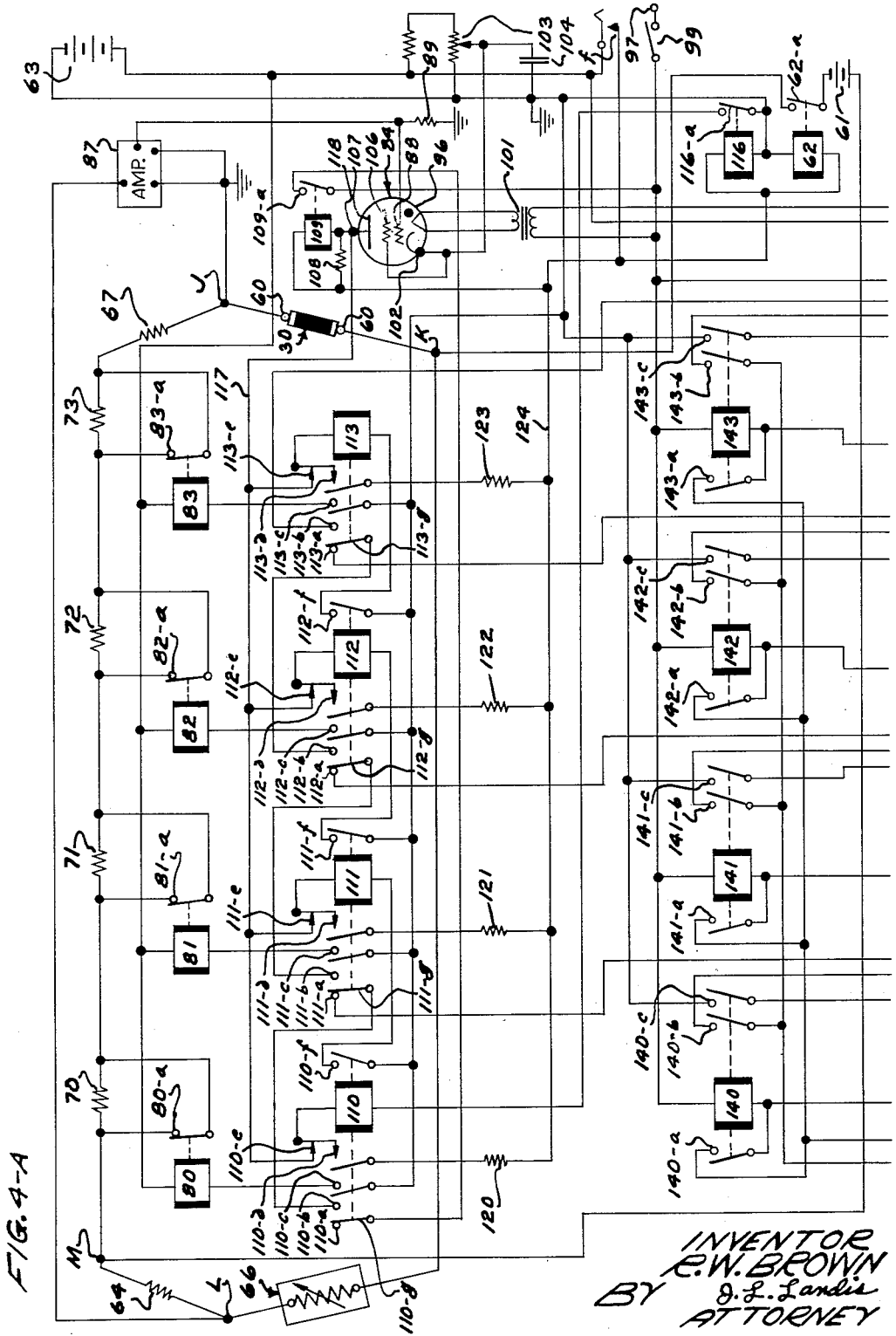

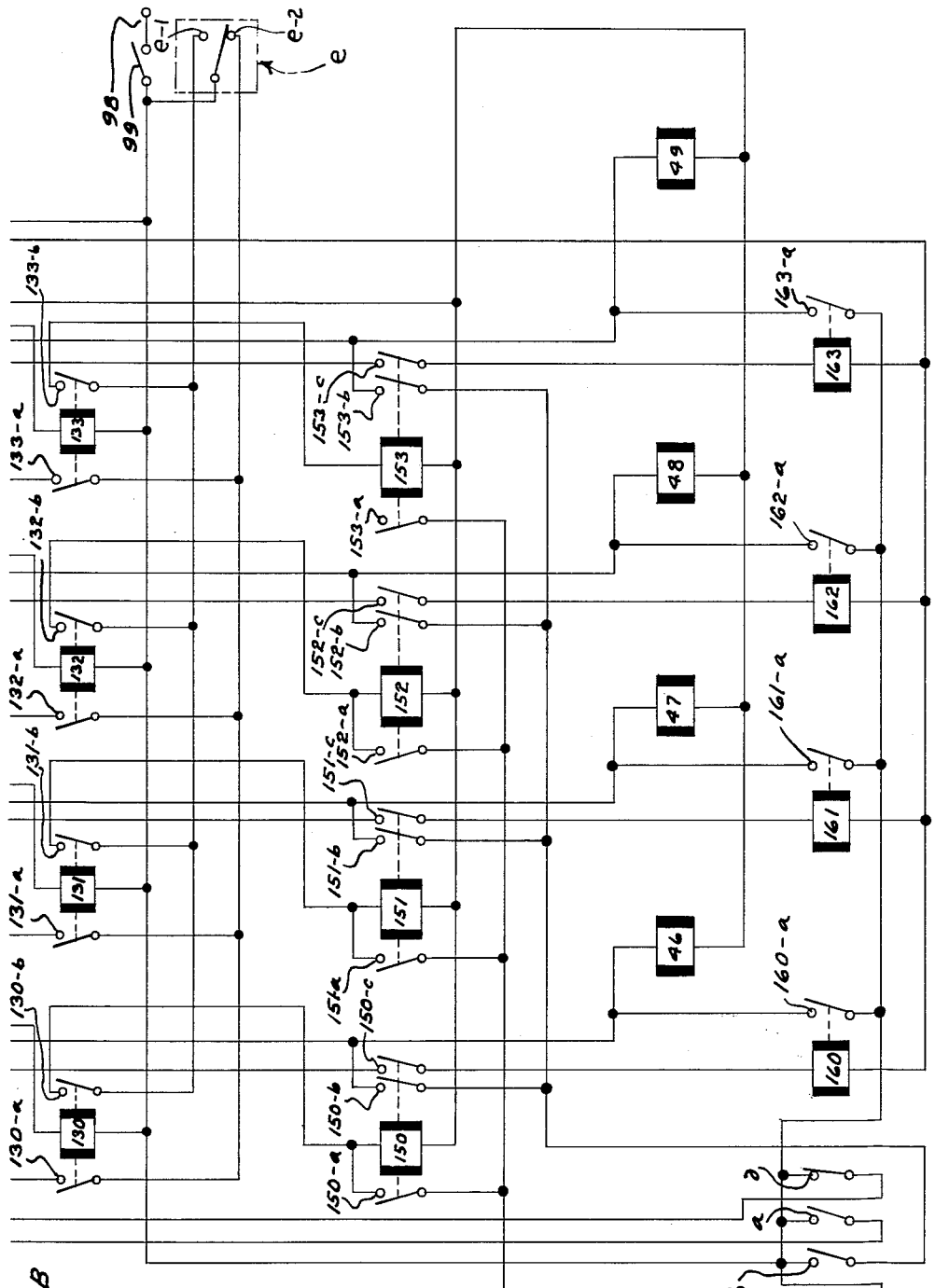

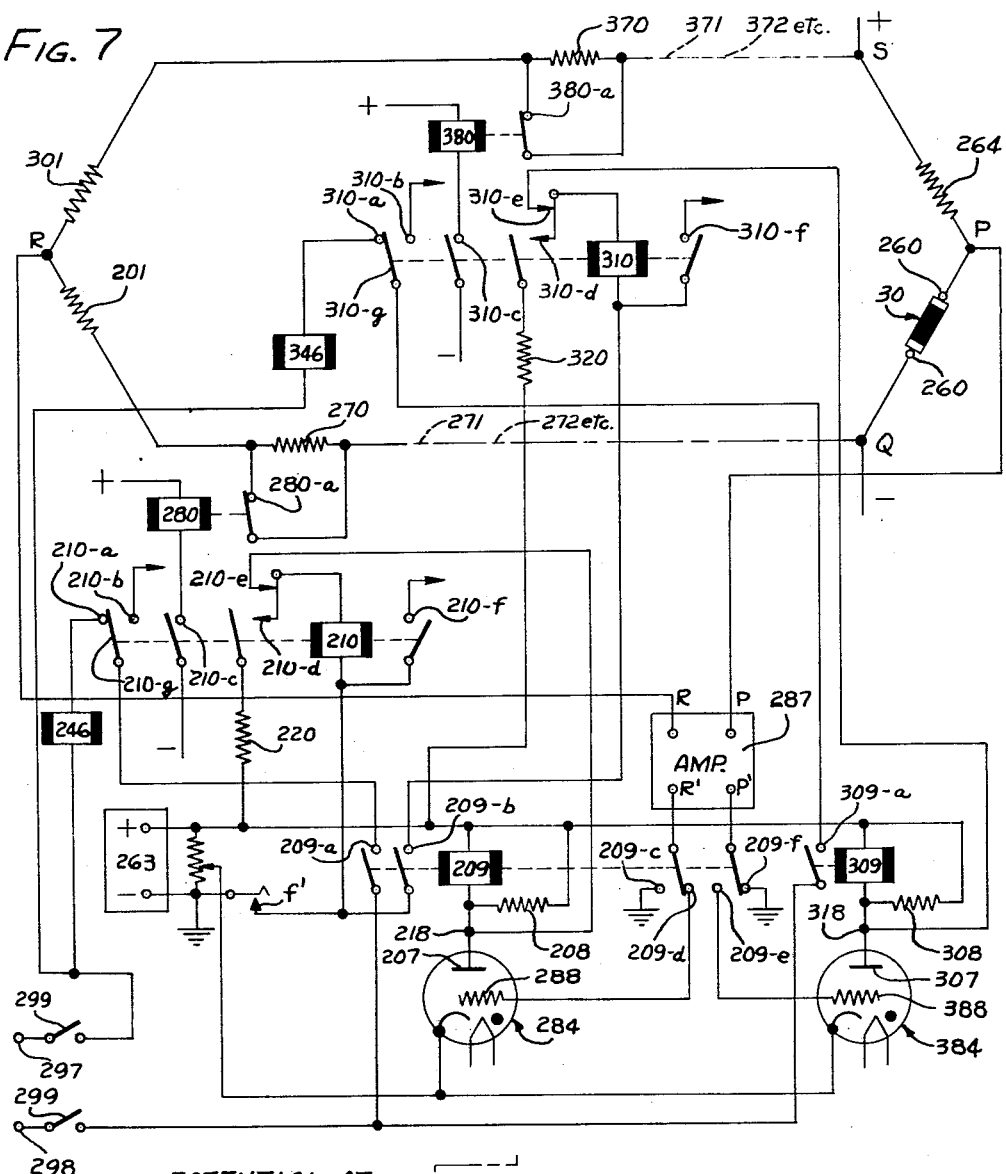
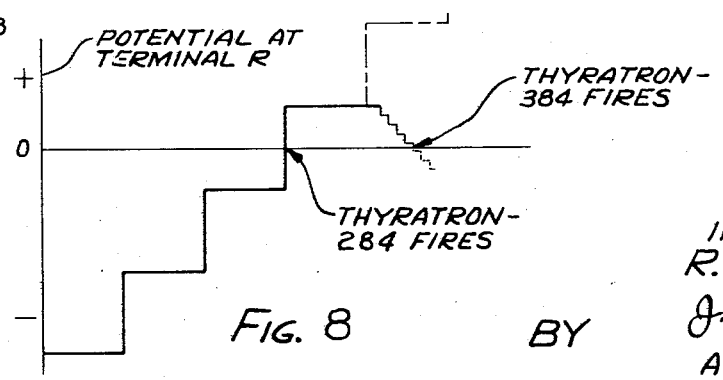

United States Patent Office 3,003,630
Patented Oct. 10, 1961

3,003,630
APPARATUS FOR SORTING RESISTORS AND CONTROL CIRCUITRY
Raymond W. Brown, Evergreen Park, Ill., assignor to Western Electric Company, Incorporated, New York, N.Y., a corporation of New York
Filed Apr. 26, 1960, Ser. No. 24,832
24 Claims. (Cl. 209—81)

The present invention relates generally to apparatus for sorting resistors and to control circuitry that is especially suitable therefor, and more particularly to apparatus and control circuits for testing a series of resistors to determine within which of several resistance categories having known maximum and minimum limits each resistor falls and for distributing the tested resistors into a group of receivers in accordance with the tested values thereof.

Accordingly, a general object of the invention is to provide new and improved apparatus for sorting resistors.

A more specific object of the invention is to provide new and improved apparatus for testing a series of resistors to determine within which of several resistance categories having known maximum and minimum limits each resistor falls and for distributing the tested resistors into a group of receivers in accordance with the tested values thereof.

Still another object is to provide new and improved control circuitry that is useful in automatically operating various testing devices, and particularly in operating the resistor-sorting devices of the invention.

In the manufacture of deposited carbon resistors in the telephone industry, small cylindrical resistors are provided having, for example, a length of ¾ inch and a diameter of ⅛ inch. These resistors are relatively fragile and are formed with a ceramic core, a thin layer of carbon applied to the core by the decomposition of hydrocarbon gases, and a conducting layer of silver paint at the ends thereof. In the manufacture of such resistors, the resistance values of the individual resistors in any one batch will vary somewhat from one resistor to the next, substantially all of the resistors being usable for one purpose or another. However, it is desirable to test the resistors to determine the resistance of each, and then to sort the resistors into a number of categories having known maximum and minimum values of resistance defined along a predetermined scale.

A specific object of the invention is to provide new and improved apparatus and control circuits for sorting a batch of deposited carbon resistors into a number of categories having known maximum and minimum values of resistance defined along a predetermined scale.

Another object of the invention is to provide an apparatus for sorting and distributing such resistors into appropriate receptacles automatically and at a high rate of speed consistent with the fragility of the resistors; for example, at a rate of at least 10,800 resistors per hour or higher.

With the foregoing and other objects in view, a control circuit in accordance with the invention may be used in combination with an apparatus of the type wherein a group of operating devices is provided that are to be energized in sequence until the occurrence of a particular event that may occur as a result of the energization of any one of the operating devices, wherein a device is provided for detecting the occurrence of the event, and wherein an ultimate device is provided that is to be operated in one of several different manners in accordance with a determination of which operating device was effective to produce the event. Such a control circuit may include a group of control relays, each of which is designed when energized for energizing an associated one of the operating devices. The control relays are arranged in an open chain such that each one but the last in the chain will energize a subsequent control relay after a distinct time delay T. Means are provided, responsive to the operation of the detecting device when the particular event has occurred, for precluding the energization of any control relay that is not already energized. The control relays are so constructed that the time delay T required to energize a subsequent control relay after the preceding one has been energized is longer than the time required for the operating device associated with the preceding control relay to be energized, plus the time required for the event to take place, plus the time required for the detecting device to determine whether or not the event has taken place, plus the time required for the energization-precluding means to function and thus prevent the energization of the subsequent control relay. Means are provided, which are responsive to the concomitant operation of the detecting device and at least one of the control relays, for selectively operating the ultimate device in accordance with the number of control relays that have been energized.

As applied to a resistor-sorting apparatus, the resistor to be tested is connected in a first arm of a bridge circuit, the operating devices comprise a group of resistors that are inserted in a second bridge arm so as to tend to balance the bridge, the detecting device comprises a thyratron that becomes conducting when the bridge output changes sense indicating the resistance category of the resistor under test, and the ultimate device comprises a distributing mechanism capable of delivering the tested resistors to any of several receivers in accordance with the number of control relays that were energized when the thyratron became conducting.

According to a first specific embodiment of the invention, a cyclically indexing transfer wheel is provided to carry the resistors to a test position during one cycle and then to an unloading position during the next cycle. In this instance, means are provided for storing information with respect to the value of the resistor under test during the testing cycle, and for releasing that information to operate a distributing device during the unloading cycle.

According to a second specific embodiment of the invention, it is desired to sort the resistors into a large number of categories. In this embodiment two control circuits are provided as previously described, one for adding resistors in gross steps into one bridge arm so as to cause the bridge to pass through balance in a first direction, and the other for adding resistors in fine steps within the gross range into another bridge arm so as to cause the bridge to pass through balance in the opposite direction. A thyratron which is responsive to the overbalancing of the bridge in the first direction is effective to initiate the second control circuit into operation.

Other objects, advantages and aspects of the invention will appear from the following detailed description of specific examples and embodiments thereof, when taken in conjunction with the appended drawings, in which:

FIG. 1 is a front view, with portions broken away, of a complete apparatus for handling deposited carbon resistors, which includes a testing and controlling mechanism according to a first specific embodiment of the present invention;

FIG. 2 is a schematic perspective view of an indexing transfer wheel and a group of operating cams;

FIG. 3 is an enlarged, fragmentary sectional view, taken generally along the line 3—3 of FIG. 2 and illustrating one resistor stopped in a testing position;

FIGS. 4-A and 4-B, when assembled as indicated in FIG. 4, constitute a schematic diagram of an electrical circuit for testing the resistors and then controlling the operation of a distributing mechanism in accordance with the test;

FIG. 5 is a graph of time vs. the state of operation of a group of switches that are controlled by the operating cams illustrated in FIG. 2;

FIGS. 6(a), 6(b) and 6(c) illustrate the output from a bridge circuit under various possible conditions;

FIG. 7 is a fragmentary schematic diagram of an electrical circuit in accordance with a second specific embodiment of the invention; and FIG. 8 is a graphical representation of the output from one bridge terminal in a specific example of the second embodiment of the invention.

*First specific embodiment*

Referring now in detail to the drawings and in particular to FIG. 1, a complete apparatus is illustrated for handling deposited carbon resistors in accordance with a first specific embodiment of the invention. The apparatus includes a testing and controlling mechanism in accordance with a first embodiment of the invention that is designated generally by the numeral 10. The mechanism 10 is designed for determining within which of several resistance categories having known maximum and minimum limits each resistor in a series of deposited carbon resistors of the type described hereinbefore falls, and for selectively controlling the operation of a distributing mechanism designated generally by the numeral 11. The distributing mechanism 11 is so controlled that each resistor in the series is distributed into that one of a group of receivers or trays which corresponds to the determined resistance category. Five trays are shown and are designated by the numerals 12 through 16.

The resistance limits or categories are determined by the mechanism 10 in any desired steps, as by 5% or 1% steps. For example, with a batch of resistors expected to have a mean value of about 110 ohms, using 5% steps, the tray 12 is designed to receive all resistors having resistance values between 100 and 105 ohms; the tray 13, those resistors between 105 and 110.25 ohms; the tray 14, those resistors between 110.25 and 115.76 ohms; the tray 15, those resistors between 115.76 and 121.55 ohms; and the last tray 16, those resistors having resistance values off the scale, either below 100 ohms or above 121.55 ohms. In practice, the number of the trays may be varied (usually between about four and eight with the particular distributing mechanism 11 illustrated) in accordance with the number of categories into which it is desired to sort the resistors, and the maximum and minimum ranges of resistance for each category may be set at any desired limits. Sometimes it is convenient to sort the resistors first into broad resistance groups (as by 5% steps) and then re-sort each broad group in a second pass through the apparatus into narrow groups (as by 1% steps).

*Overall arrangement of the resistor-handling apparatus*

The complete apparatus illustrated in FIG. 1 includes a "Syntron" vibratory feed unit, designated generally by the numeral 17, having a bowl 18 into which the resistors are placed in random fashion. The "Syntron" unit 17 orients the resistors and advances them in a continuous train along an upwardly spiralling track formed around the bowl 18 and through an outlet tube 19 to a sizing gage designated generally by the numeral 21. The gage 21 is provided with a gap 22 through which broken or undersize resistors pass out of the system.

From the sizing gage 21, the resistors are advanced through a delivery tube 23 by a Venturi feed unit, designated generally by the numeral 24, to a cyclically indexing transfer wheel designated generally by the numeral 26. A photocell unit, designated generally by the numeral 27, is provided along the delivery tube 23 for detecting occasions when the delivery tube is not filled with resistors between the transfer wheel 26 and the photocell unit 27. When resistors are absent in the delivery tube 23 opposite to the photocell unit 27, that unit precludes further rotation of the transfer wheel 26 until such time as sufficient additional resistors have been supplied by the Syntron unit 17 and the Venturi feed unit 24 to refill the delivery tube 23 up to the photocell unit 27. Additional information with respect to the construction and operation of the resistor-feeding elements 17 through 27 may be obtained from a first related copending application of William F. Stephen, Serial No. 10,215, filed February 23, 1960 and assigned to the Western Electric Company.

The transfer wheel 26 is intermittently rotated through a predetermined angle by an indexing motor 28 and is of a type having a plurality of resistor-receiving seats or bores 29—29 therethrough (twelve being shown in FIG. 2) provided at equally spaced intervals near the outer periphery thereof. Preferably the wheel 26 is of a suitable nonconductive plastic material such as Lucite. Each time the wheel 26 is indexed through one step (an angle of 30°), an empty one of the seats 29—29 is moved into an uppermost or loading position X in alignment with the delivery tube 23, at which time a resistor 30 is forced by the Venturi feed unit 24 into such uppermost seat 29.

The wheel 26 is positioned between a pair of nonconducting backing plates 31 and 32 so that the resistors are retained within the seats 29—29 as the wheel 26 is rotated intermittently in a counterclockwise direction, as viewed in FIG. 2, to carry the resistors 30—30 in the seats 29—29 to a testing position Y and then to a lowermost or unloading position Z. As the wheel is cyclically indexed to stop each resistor in the testing position Y (which is preferably one step in advance of the unloading position Z), the electrical testing and controlling mechanism 10 operates to determine the resistance category thereof and prepares to operate the distributing mechanism 11 in accordance with the results of the test during the next cycle when the tested resistor 30 has been advanced one more step to the unloading position Z.

As the transfer wheel 26 carries each resistor 30 in the series to the unloading position Z, the resistor is ejected from the associated seat 29 (the backing plate 31 being cut away at the position Z) and is advanced into the distributing mechanism 11 by a propelling mechanism designated generally by the numeral 34. The propelling mechanism 34 includes a jet of compressed air 36 that ejects each resistor 30 from the seat 29 and urges the resistor into an entrance end 37 of a second Venturi feed unit designated generally by the numeral 38. The Venturi feed unit 38 is also constructed in accordance with the principles of the first Stephen application mentioned hereinbefore, Serial No. 10,215, and is effective to propel the resistors, one at a time as supplied by the transfer wheel 26, from right to left as viewed in FIG. 1 into the distributing mechanism 11.

In practice, the Venturi units 24 and 38, the electrical testing and controlling mechanism 10, the indexing motor 28, and the distributing mechanism 11 are so constructed and arranged as to handle the resistors 30—30 at a rate of about 10,500 per hour with relative ease. Even faster rates, up to at least about 18,000 resistors per hour, could readily be achieved except that the relatively fragile nature of deposited carbon resistors limits the rate of operation in accordance with the speed at which they may safely be propelled through the distributing mechanism 11.

The specific distributing mechanism 11 illustrated is described in detail in a second related copending application of William F. Stephen, Serial No. 24,767, filed April 26, 1960 and assigned to the Western Electric Company. In general, the mechanism includes a group of pivotable selector blocks 41—41 (four being shown for simplicity) that are associated one with each resistance category and also with a corresponding one of the trays 12 through 15. The selector blocks 41—41 are mounted in a horizontal row, as viewed in FIG. 1, with each block 41 being provided with a straight circular bore 42 of sufficient size to pass the resistors 30—30 therethrough. Each block 41 is normally pivoted downward by a spring 43 so that all of the bores 42—42 are in direct horizontal alignment along the line of advancement of the resistors 30—30 by the second Venturi unit 38. With this arrangement, the resistors 30—30 may be propelled by the second Venturi feed unit 38 through the aligned bores 42—42 of all selector blocks 41—41 that are in the normal position of any time.

Each of the four selector blocks 41—41 may be pivoted upward by an associated one of four solenoids 46, 47, 48 and 49 (shown only in FIG. 4-B) from the normal position (illustrated in FIG. 1 with respect to the first, second and fourth blocks 41—41) to an operated position (illustrated with respect to the third block 41). When the third block 41 has been pivoted to the operated position, the next resistor 30 in the series will pass through a downwardly curved passageway 51 to the associated tray 14. The passageway 51 is defined between each selector block 41, when operated, and a curved guide block 52 mounted therebelow. Each passageway 51 leads downward through a baffle 53 to the associated one of the trays 12 through 15.

If the tested value of any resistor 30 in the series is within the preset scale of the testing and controlling mechanism 10 (between 100 and 121.55 ohms in the specific example), the mechanism 10 energizes that one of the solenoids 46 through 49 which is effective to distribute the tested resistor to the corresponding one of the trays 12 through 15. In the event that any resistor 30 is off scale (either under 100 ohms or over 121.55 ohms), then none of the solenoids 46 through 49 is energized whereby none of the selector blocks 41—41 is pivoted so that the resistor 30 proceeds down an end passageway 54 of the distributing mechanism 11 to the last tray 16.

*Testing and controlling mechanism*

Referring now to FIG. 2, the motor 28 is provided with a shaft 56 that serves to index the transfer wheel 26 through an angle of 30° (the spacing between adjacent seats 29—29) once for each revolution of the shaft 56 by means of a Geneva drive unit designated generally by the numeral 57. The motor shaft 56 also drives a cam shaft 58 at one-quarter speed through any suitable drive linkage, such as a sprocket-and-chain transmission designated generally by the numeral 58'. Six cams, identified by the letters A through F, are mounted on the cam shaft 58 and execute one complete revolution for each four cycles or indexing movements of the transfer wheel 26.

Referring to FIGS. 2 and 3, as each resistor 30 is stopped at the testing position Y, each of a pair of silvered ends 59—59 thereof is engaged between a pair of opposed spring biased contact members 60—60. The pairs of contact mmbers 60—60 are mounted on the non-conducting backing plates 31 and 32 on opposite sides of the transfer wheel 26 at the position Y so as to engage the resistor ends 59—59, which overhang the seat 29 on either side. As indicated in FIG. 4-A, the contacts 60—60 serve to connect the resistor 30 in a first ratio arm J—K of a Wheatstone bridge circuit J—K—L—M.

The bridge J—K—L—M may be energized across a pair of diagonally disposed input terminals K and M thereof by means of a suitable D.C. source, such as a bridge battery 61 shown near the lower right-hand corner of FIG. 4-A. The bridge circuit is so energized near the beginning of each cycle when a contact 62–a of a bridge-energizing relay 62 is closed. The relay 62 is in turn energized from an auxilary D.C. source, such as a battery 63 shown in the upper right-hand corner of FIG. 4-A, whenever a cam-operated switch f is closed. As indicated in FIGS. 2 and 5, the switch f is closed by the cam F 15° after the start of each cam shaft cycle of 90° and is reopened after 75° of each cycle. Thus, the switch f is closed during the central two-thirds of each cycle (approximately 200 milliseconds based on 12,000 resistors per hour) and is open during the first and final one-sixth of each cycle (approximately 100 milliseconds total). During the closed interval the testing operation takes place, while during the open interval the transfer wheel 26 is indexed one step.

In the bridge arm L—M, a standard resistor 64 is provided, which is preferably a 100-ohm resistor because a value of approximately 100 ohms has been ascertained to provide the greatest bridge sensitivity over a total range of about 5 to 5,000 ohms for which the bridge is to be used in the specific construction illustrated. In the bridge arm K—L, an adjustable range-setting resistor is provided, such as a decade resistance box designated generally by the numeral 66. In the bridge arm M—J, a standard resistor 67 is always provided (preferably 100 ohms) together with a group of four measuring resistors 70, 71, 72 and 73 which may be added into the arm M—J to increase the resistance of that arm by the selected steps.

According to well-known principles, when the bridge J—K—L—M is balanced:

$$\frac{J-K}{M-J} = \frac{K-L}{L-M}$$

Assuming that the standard resistor 64 in arm L—M is 100 ohms, then at balance J—K (the resistor 30 under test) =

$$\frac{(K-L)(M-J)}{100}$$

Referring to the specific example set out hereinbefore (wherein the resistors 30—30 are to be sorted in 5% steps into groups of 100 to 105 ohms, 105 to 110.25 ohms, 110.25 to 115.76 ohms, and 115.76 to 121.55 ohms), the range-setting resistor 66 (arm K—L) will be set at 100 ohms. In this specific example, J—K=M—J at balance. The testing resistors 70 to 73 are graduated in 5% steps relative to 100 ohms; thus, the resistor 70=5 ohms, the resistor 71=5.25 ohms, the resistor 72=5.51 ohms, and the resistor 73=5.79 ohms. For any other range, the adjustable resistor 66 is set at a value equal to the lowest value expected for the resistors 30—30 to be tested, and the measuring resistors 70 to 73 will then operate in 5% steps beginning with the value of the resistor 66.

At the beginning of each testing cycle, the four measuring resistors 70 through 73 are shunted through normally closed contacts 80–a, 81–a, 82–a and 83–a of a group of associated operating relays 80 through 83 that are deenergized at the start of each cycle. After a resistor 30 is connected in the arm J—K and the switch f is closed so that the battery 61 is applied across the terminals K and M, the resistor 30 is first compared against the 100 ohm resistor 67 in arm M—J. If the resistor 30 is below 100 ohms (too low in the 100-121.55 ohm scale), the initial bridge output at the terminal L will be positive, FIG. 6(b), and a thyratron 84 will become conducting to prevent the energization of any of the operating relays 80 through 83 as will be discussed in detail hereinafter. This precludes the energization of any of the solenoids 46—49 (FIG. 4-B) previously described and thus consigns the resistor 30 to the "over-and-under" tray 16 (FIG. 1).

If, as expected, the resistor 30 is above 100 ohms, then the initial output at the terminal L will be negative, as viewed in FIGS. 6(a) and 6(c), and the thyratron 84 will not fire. After a predetermined time delay, the first operating relay 80 is energized to add the 5 ohm resistor 70 into the ratio arm M—J and the resistor 30 is then compared against 105 ohms in the arm M—J. In the event that the resistor 30 is between 100 and 105 ohms, the output terminal L becomes positive to fire the thyratron 84. The thyratron 84 functions (1) to preclude energization of the additional operating relays 81—83 and (2) to energize the solenoid 46 so as to distribute the tested resistor 30 into the tray 12 corresponding to 100–105 ohms.

Similarly, if the resistor 30 is between 105 and 110.25 ohms, the operating relay 81 will also be energized to add in the resistor 71 (in addition to the resistor 70 added in the preceding step), and the solenoid 46 will be operated to deliver that resistor to the second tray 13. If the resistor 30 is between 110.25 and 115.76 ohms, the output terminal L becomes positive when the resistor 72 is added into the bridge arm M—J by the third operating relay 82, illustrated in FIG. 6(a). In this case, the third solenoid 48 is operated to distribute the resistor 30 to the third tray 14. If the resistor 30 under test is between 115.76 and 121.55 ohms, the measuring resistor 73 is added into the bridge arm M—J by the fourth operating relay 83 and the thyratron 84 operates the solenoid 49 to deliver the resistor 30 to the fourth tray 15. In the event that the resistor 30 is too high for the range employed, above 121.55 ohms in the specific example, then the bridge output does not change sense even with all of the resistors 70—73 in the arm M—J, as viewed in FIG. 6(c). In this case, the thyratron 84 does not fire and none of the solenoids 46—49 is energized, whereby the resistor 30 passes to the "over-and-under" tray 16.

The bridge output from the terminals L and J is impressed upon a D.C. amplifier 87, and the output from the amplifier 87 is connected to the control grid 88 of the thyratron 84. A grid resistor 89 is provided in order to furnish a high-resistance load for the amplifier 87 and prevent the grid 88 from "floating."

A heater element 96 of the thyratron 84 is energized across a pair of A.C. terminals 97 (FIG. 4–A) and 98 (FIG. 4–B) through power switches 99—99 and a transformer 101. A cathode 102 of the thyratron 84 is connected to a potentiometer 103 to provide positive bias with respect to the grid, which is at ground potential. A capacitor 104 maintains the voltage drop from the potentiometer 103 to ground at the bias value. A screen grid 106 is connected to the cathode 102. A plate 107 of the thyratron 84 is connected to the positive terminal of the battery 63 through the cam-operated switch $f$ and a parallel combination of a resistor 108 and a sensing relay 109. The thyratron 84 and the various control elements therefor are so adjusted that the thyratron 84 becomes conducting and energizes the sensing relay 109 in the plate circuit thereof each time the potential at the bridge terminal L changes in sense from negative to positive as a result of the operation of the bridge J—K—L—M.

A group of four control relays 110, 111, 112 and 113 is provided, each of which is associated with and is designed for energizing a corresponding one of the operating relays 80, 81, 82 and 83. The control relays 110 to 113 are arranged in an open chain, and are energized in timed sequence as the testing operation proceeds so as to energize the associated operating relays 80, 81, 82 and 83 in timed sequence.

In each testing cycle, after the cam-operated switch $f$ has been closed, a starting relay 116 is energized across the battery 63 so as to close a contact 116–a. As soon as the contact 116–a is closed, a circuit is completed for energizing the first control relay 110 in the chain through the now-closed contact 116–a, the coil of the relay 110, a normally closed contact 110–e of the relay 110, and a conductor 117 to a connection 118 in the plate circuit of the thyratron 84. As previously mentioned, the plate 107 of the thyratron 84 is connected to the positive terminal of the battery 63 through the cam-operated switch $f$ and a parallel combination of the resistor 108 and the sensing relay 109. The energization current for the relay 110 is insufficient to energize the sensing relay 109 associated with the thyratron 84 due to the parallel resistor 108; however, when the thyratron 84 fires, the heavier current produced thereby is sufficient to energize the sensing relay 109.

The control relay 110 is preferably a time delay relay relative to the system in which it is located, whereby a pair of normally closed contacts 110–a and 110–e will not open and a set of normally open contacts 110–b, 110–c, 110–d and 110–f will not close until a predetermined time T after the switch $f$ and the relay contact 116–a have been closed to complete the energization circuit for the relay 110. The time delay T is preferably quite small on an absolute basis and in the specific example wherein the control relays comprise wire spring relays, the time T is approximately six milliseconds. Thus, under normal conditions, six milliseconds after the cam-operated switch $f$ closes to apply battery to the bridge J—K—L—M, the first control relay 110 will be energized; however, in the event that the particular resistor 30 under test is off scale on the low side (below 100 ohms in the specific example), the thyratron 84 fires substantially instantaneously and prior to the lapse of the six-millisecond time delay T so as to preclude energization of the first control relay 110.

When the thyratron 84 becomes conducting, the plate current thereof opposes that in the conductor 117 at the connection 118 thereof in the plate circuit and precludes the energization of the control relay 110. With this arrangement, the potential available at the plate 107 of the thyratron drops from 48 volts before the thyratron 84 fires to approximately 8 volts thereafter, the latter value being insufficient to permit energization of the control relay 110. An important aspect of the invention is that the control relay 110 will not be energized to change the state of its contacts until after the distinct time delay T, which is required to be sufficiently long after the initial energization of the bridge J—K—L—M so as to allow the thyratron 84 to fire when the resistor 30 is too low and thus preclude the energization of the control relay 110.

In the event that the resistor 30 under test is on scale (above 100 ohms), the thyratron 84 does not fire and the control relay 110 is energized after the first six milliseconds to open the contacts 110–a and 110–e and close the contacts 110–b, 110–c, 110–d and 110–f. When the contact 110–c closes, the first operating relay 80 is energized to open the contact 80–a and thus add the first measuring resistor 70 into the bridge arm M—J. The operating relays 80 through 83 are quick-acting as compared to the associated control relays 110 through 113, and preferably are mercury relays that will open their associated contacts after a time of approximately three milliseconds as compared with six milliseconds for the control relays.

At the same time, the control relay 110 is locked in through the contact 110–d, which is a holding contact, and a resistor 120. The contacts 110–d and 110–e constitute a "make before break" set, whereby the contact 110–d closes before the contact 110–e opens. When the contact 110–e opens, the initial energization circuit for the relay 110 through the connection 118 in the plate circuit of the thyratron 84 is broken and the relay 110 is thus isolated from the thyratron 84.

In a similar manner, the other control relays 111, 112 and 113 are locked in after the initial energization thereof through the corresponding contacts 111–d, 112–d and 113–d and an associated set of resistors 121, 122 and 123. These holding circuits for the operating relays 110 to 113 are connected through a common conductor 124 so as to parallel the connection 118 in the plate circuit of the thyratron 84. With this arrangement, all of the control relays 110 through 113 that have previously been energized at the time when the thyratron 84 fires will remain energized through the locking contacts 110–d through 113–d, whereas the firing of the thyratron 84 precludes the initial energization of any control relay that has not already been energized and locked in as of that time.

In addition, when the control relay 110 is energized and closes the contact 110–f, an initial energization circuit is completed for the second control relay 111 in the chain through the contact 110–f, the coil of the relay 111, the contact 111–e thereof and the connection 118 in the plate circuit of the thyratron 84. Through this circuit, the control relay 111 will be energized after the predetermined time delay T, which is preferably also approximately six milliseconds. The time delay T required to energize the second control relay 111 in the chain must be longer than the time required for the operating relay 80 associated with the preceding control relay 110 to be energized and thus add the resistor 70 into the bridge arm M—J, plus the time required for the thyratron 84 to become conducting and thus prevent the energization of the second control relay 111 in the event that the bridge passes through balance as a result of the addition of the resistor 70 into the bridge arm M—J. Thus, the second control relay 111 will be energized by the first control relay 110 only if the resistor 30 under test is above the range of the measuring resistor 70, or above 105 ohms in the specific example.

While the time delay T is conveniently controlled and is held to a practical minimum by the indicated selection of the relay groups 110 to 113 and 80 to 83 so that the inherent times of energization are sufficient to prevent energization of the control relays 110 to 113 until there has been sufficient time in each case for the thyratron to become conducting, it is apparent that various other means could be utilized, if necessary, for performing this function. For example, among other arrangements, the contact 110–f of the control relay 110 could be a time-to-close contact, while the other contacts would be quick-acting contacts.

In the event that the resistor 30 is above 105 ohms, the thyratron 84 does not fire and the second control relay 111 is energized after the time delay T and operates (1) to close the contact 111–c and thus energize the associated operating relay 81, (2) to close the contact 111–d and thus lock in the relay 111, and (3) to close the contact 111–f so as to energize the next control relay 112 in the chain after the predetermined time delay T. The control relays 112 and 113 (and any additional control relays that might be provided) are then energized in chain fashion until all have been energized or until such earlier time as the thyratron 84 becomes conducting to preclude the energization of any control relay in the chain that is not already energized and locked in. If the thyratron 84 has not fired after all of the control relays 110 to 113 have been energized, the resistor 30 under test is known to be off the scale on the high side (over 121.55 ohms in the specific example) as indicated in FIG. 6(c).

In each instance where the thyratron 84 fires after and as a result of the energization of one of the four control relays 110 through 113 (indicating that the tested resistor 30 is on scale), one of a group of four directing relays 130, 131, 132 and 133 (FIG. 4–B) is energized. The four directing relays 130 to 133 are associated one with each of the four control relays 110 to 113 and one with each of the first four trays 12 to 15, and are designed for selectively operating the distributing mechanism 11 so as to distribute each tested resistor 30 into that tray which corresponds to the tested resistance category as indicated by the number of control relays 110 to 113 in the chain that were energized when the thyratron 84 became conducting.

For example, in the event that the control relay 110 was the only one energized (100 to 105 ohms), the first directing relay 130 is energized across the A.C. terminals 97 and 98 through the now closed contact 109–a of the sensing relay 109 (which relay is energized each time that the thyratron 84 fires), through the now closed contact 110–b of the energized first control relay 110, and through the normally closed contact 111–a of the non-energized second control relay 111. In similar fashion, when the second control relay 111 was the last one energized (105–110.25 ohms), the associated directing relay 131 is energized through a similar circuit, but in this instance including the closed contact 110–b of the first control relay 110, the now closed contact 111–b of the second control relay 111, and the normally closed contact 112–a of the unoperated third control relay 112. Correspondingly, when the third control relay 112 was the last one energized (110.25–115.76 ohms) then the directing relay 132 is energized through the contacts 110–b, 111–b, 112–b and 113–a. When the last operating relay 113 in the chain has been energized and the thyratron 84 has also fired, the directing relay 133 is energized through the contacts 110–b, 111–b, 112–b and 113–b.

Conveniently, the circuit for energizing the directing relays 130 to 133 in accordance with a determination of which one of the associated control relays 110 to 113 was the last one to be energized includes a double contact associated with each control relay and having a swinging contactor (designated 110–g through 113–g) that engages a normally closed contact (110–a through 113–a) when the relay is de-energized and engages a normally open contact (110–b through 113–b) when the relay is energized. As indicated in FIG. 4–A, the normally open b contact of each control relay but the last (113) in the chain is connected in series when the contactor of the next successive control relay; the contactor 110–g of the first control relay 110 is connected to the power terminal 97 through the normally open contact 109–a of the sensing relay 109; the normally closed a contact of each control relay but the first (110) is the chain is connected in series with the coil of the directing relay associated with the next preceding control relay; and the normally open contact 113–b of the last control relay 113 in the chain is connected in series with the coil of the directing relay 133 associated therewith.

In those cases where the resistor 30 under test is too low, none of the directing relays 130 through 133 is energized because, although the thyratron 84 fires to close the contact 109–a, the normally closed contact 110–a of the first control relay 110 is not connected; whereas, when the resistor 30 is off scale on the high side, none of the directing relays 130 through 133 is energized because, although the contact 113–b is closed, the contact 109–a remains open because the thyratron 84 did not become conducting to energize the sensing relay 109. In this connection, it should be noted that if it were desired to classify resistors that are too high for the scale differently than resistors that are too low, the normally closed contact 110–a of the first control relay 110 could be connected so as to energize an additional directing relay (not shown) that would be designed for operating a selector block associated with an additional tray for collecting resistors that are too low for the scale.

Assuming that the resistor 30 under test is between 100 and 105 ohms, and that the directing relay 130 has therefore been energized, that relay simultaneously closes a first contact 130–a and a second contact 130–b. The first contact 130–a is designed to energize a first selector relay 140 in a first group of four selector relays 140 through 143 (FIG. 4–A) that are associated one with each of the directing relays 130 through 133. In a similar manner, the second contact 130–b is designed to energize a first selector relay 150 in a second group of selector relays 150 through 153 that are similar in operation to the first group 140 through 143. The two groups of selector relays 140 to 143 and 150 to 153 operate alternately to energize the solenoids 46 through 49 so as to distribute each tested resistor 30 into the corresponding one of the trays 12 through 15.

A cam-operated switch e is provided (FIG. 4–B) for permitting the energization of selector relays in only one of the groups 140 to 143 and 150 to 153 at any one time and for alternating the permitted group each time the transfer wheel 26 indexes. As indicated in FIG. 5, the cam E operates to close a first contact e–1 of the switch e during each odd cycle and a second contact e–2 during every even cycle. Assuming that during the first cycle the contact e–2 is closed as illustrated in FIG. 4–B, and further that the first directing relay 130 has been energized, then the selector relay 140 is energized across the A.C. terminals 97 and 98 through the contact 130–a of the relay 130 and the contact e–2. When energized, the relay 140 closes three normally open contacts 140–a, 140–b and 140–c thereof.

Upon closure of the contact 140–a, the relay 140 is locked in through the contact 140–a and a cam-operated switch d that is closed after the first 22½° of the first cycle and remains closed until after the first 67½° of the second cycle. As is evident from FIG. 5, the timing cycle is so arranged that the switch d is always closed before the end of the testing portion of the first cycle and before there has been time for the associated directing relay 130 to energize the selector relay 140. It is also apparent that the selector relay 140 will be maintained energized through the holding contact 140–a and the switch d until the time near the end of the second cycle when the switch d reopens, even though the directly relay 130 which initiated the energization of the selector relay 140 becomes deenergized near the end of the first cycle as the cam-operated switch f re-opens. When the switch f opens, the relay 130 is de-energized, as are all other relays (62, 80, 109, 110 and 116) that were energized previous to the energization of the selector relay 140. These relays are now prepared for the next successive testing cycle.

In a similar fashion, the remaining selector relays 141 through 143 in the first group are initially energized through associated first contacts 131–a through 133–a of the directing relays 131 to 133 whenever those relays are energized as a result of the testing cycle and are locked in through corresponding contacts 141–a through 143–a and the cam-operated switch d.

Referring again to the specific example, wherein the selector relay 140 was energized during the first cycle, the contact 140–b thereof is also closed and will become effective to energize the solenoid 46 as soon as a cam-operated switch a is closed. Referring again to FIGS. 2 and 5, the cam A is not designed to close the switch a until after the first 17½° of the second cycle, at which time the transfer wheel 26 will have been indexed through one complete step so as to bring the resistor 30 just tested (with respect to which the selector relay 140 has been energized) to the discharge position Z.

When the solenoid 46 is energized, as previously mentioned, it operates to pivot the first selector block 41 in the group to the operated position so as to distribute the tested resistor 30 into the first tray 12, which corresponds to a range of 100 to 105 ohms. In similar fashion, if one of the selector relays 141 through 143 is energized during the testing cycle, the associated one of the remaining solenoids 47 through 49 is energized when the switch a is closed during the next cycle so as to distribute the tested resistor 30 into the corresponding one of the trays 13 through 15.

As previously mentioned, the cam E is effective during the second cycle to close the contact e–1 of the switch e, whereby energization of the second group of selector relays 150 through 153 is permitted through the second contacts 130–b through 133–b of the directing relays 130 through 133. For example, if the selector relay 151 is energized during the second testing cycle, that relay is locked in through the contact 151–a and a cam operated switch c. As illustrated in FIG. 5, the switch c closes shortly after the start of the second cycle and does not re-open until near the end of the third cycle. During the third cycle, the solenoid 47 is energized through the relay contact 151–b when a cam-operated switch b is closed by a cam B after the indexing portion of the third cycle.

It should be noted that the two groups of selector relays 140—143 and 150—153 operate alternately, whereby one group is always in condition to receive and store information with respect to the value of a resistor under test, while the other group is in condition to release the stored information so as to operate the distributing mechanism 11 in accordance with the value of the resistor which was tested in the preceding cycle. In the event that the unloading position Z were more than one step from the testing position Y, additional groups of selector relays would be required together with operating cams therefor in such numbers that there would be one relay group in excess of the number of steps between the testing position and the unloading position.

Although the solenoids 46—49 may be controlled solely by the selector relays 140—143 and 150—153, it is preferred to provide a group of four holding relays 160 through 163, each of which is designed to maintain an associated one of the solenoids 46—49 energized to hold the associated selector block 41 in the operated position whenever two resistors in series are to be distributed to the same one of the trays 12 through 15. Since it often happens that several resistors in a row have the same limits and are to be directed to the same tray, this provision reduces unnecessary wear and noise.

When energized, the holding relays 160—163 energize the associated solenoids 46 to 49 through slow-release contacts 160–a through 163–a and a group of holding circuits shunting the normal energization circuits for the solenoids 46 to 49 through the cam-operated switches a and b. Assuming that in the first cycle the selector relay 140 was energized so as to energize the solenoid 46 during the second cycle to distribute the first resistor 30 to the tray 12, the solenoid 46 will remain energized until a time 22½° from the end of the second cycle when the switch d re-opens to de-energize the selector relay 140. If, during the second cycle, the directing relay 130 is again energized indicating that the second resistor 30 is also to be distributed into the tray 12, the selector relay 150 is energized near the middle of the second cycle and the selector relays 140 and 150 are both energized at the same time. When this simultaneous energization occurs, a third contact 140–c of the relay 140 is closed and a third contact 150–c of the relay 150 is likewise closed to complete an energization circuit for the holding relay 160.

When the holding relay 160 is so energized, the solenoid 46 is maintained energized through the slow-release contact 160–a. When the switch d re-opens 22½° from the end of the second cycle to de-energize the first-operated selector relay 140 and thus break the energization circuit for the holding relay 160 and the initial energization circuit for the solenoid 46, the slow-release contact 160–a remains closed until after the switch b closes, which time is 17½° after the start of the third cycle, so as to re-establish the energization circuit for the solenoid 46 through the second contact 150–b of the selector relay 150.

The re-opening time of the contact 160–a must be sufficient to bridge the 40° gap between the time that the switch d (or c) re-opens and the time that the switch a (or b) closes so that the solenoid 46 is maintained energized. The holding relays 161, 162 and 163 operate in a similar manner through slow-release contacts 161–a, 162–a and 163–a to maintain the solenoids 47, 48 and 49 energized whenever the relays 141 and 151, 142 and 152, and 143 and 153 are energized in successive steps.

*Second specific embodiment*

Referring now to FIGS. 7 and 8, a control circuit is illustrated in accordance with a second specific embodiment of the invention. In this embodiment, it is required to distribute a series of resistors 30—30 into a large number of categories having known maximum and minimum resistance limits. For example, it might be required to sort all resistors manufactured into 5% categories, the resistors having values ranging between about 10 and 17,000 ohms, automatically and without the use of a range-setting resistor such as the decade resistance box 66. This requires approximately 144 categories differing by 5%.

In this type of sorting operation, it is preferable first to sort the resistors into gross categories, such as twelve categories differing from each other by 79.6%, and then to re-sort each gross category into 5% groups as discussed previously with respect to the first embodiment of the invention. With this arrangement, the maximum number of measuring steps is only 24, as compared with 144 on a straight chain basis.

As illustrated in FIG. 7, a modified bridge P—Q—R—S is provided, wherein the range-setting resistance box 66 of the first embodiment of the invention is replaced by an automatic mechanism similar to the mechanism of the first embodiment of the invention for adding resistors into one bridge arm Q—R in chain fashion so as to determine a gross range, followed by a switch-over whereby resistors are added in fine steps into another bridge arm R—S as previously described in the first embodiment of the invention. The modified bridge P—Q—R—S is energized across the terminals Q and S, and the output from the terminals P and R is impressed upon an amplifier 287 having output terminals P' and R'. The amplifier 287 corresponds to the amplifier 87 in the first embodiment of the invention, and all elements associated with a first portion of the circuit which is designed to determine the gross range have been given numerals beginning with 200 and corresponding in their last two digits to those utilized in FIGS. 4–A and 4–B. Similarly, the fine adjusting portions of FIG. 7 which correspond to elements illustrated in FIGS. 4–A and 4–B have been given corresponding numerals starting with the numeral 300.

Considering now the modified bridge P—Q—R—S, the resistor 30 under test is inserted between a pair of terminals 260—260 in the arm P—Q; a 100-ohm standard resistor 264 is provided in the arm S—P; a measuring resistor 201 of 17.96 ohms is always present in the arm Q—R, with twelve additional measuring resistors being arranged for addition into the arm Q—R (only a first such resistor 270 being shown); and a standard measuring resistor 301 of 100 ohms is always present in the arm R—S, together with a group of twelve additional measuring resistors which may be added in chain fashion beginning with a resistor 370 that is illustrated.

The measuring resistors beginning with 270 in the arm Q—R differ from each other by 79.6% steps, while those beginning with 370 in the arm R—S differ by only 5% steps. The balance equation for the bridge P—Q—R—S is:

$$\frac{P-Q}{S-P} = \frac{Q-R}{R-S}$$

Assuming that the resistors 264 and 301 are 100-ohm resistors, and that the fine measuring resistors beginning with 370 are not to be added until a second phase of each cycle, then during a first phase of the cycle the bridge will balance when the total resistance in the variable bridge arm Q—R equals that of the resistor 30 under test, and the output terminal R will pass from negative to positive during that step wherein the total resistance in the variable arm Q—R becomes greater than that of the resistor 30 under test and the bridge P—Q—R—S overbalances.

At the beginning of each testing cycle, after the resistor 30 has been connected in the bridge arm P—Q, a switch $f'$ is closed to initiate the testing operation and to complete an energization circuit for a first control relay 210 through a connection 218 in the plate circuit of a first thyratron 284 and a parallel connection of a first resistor 208 and a first sensing relay 209 to the positive terminal of a D.C. source 263. This connection and the manner of operation of the control relay 210 is exactly the same as was described with respect to the control relay 110 in the first embodiment of the invention. The grid 288 of the thyratron is connected to the output terminal R' of the amplifier 287 through a normally closed contact 209–d of the first sensing relay 209, while the output terminal P' is grounded through a normally closed contact 209–f. With this arrangement, the first thyratron 284 becomes conducting to preclude the energization of any unoperated relays in the first chain beginning with the control relay 210 as soon as the output terminal R shifts from negative to positive, and to energize the associated sensing relay 209 at the same time.

If the resistor 30 is above 17.96 ohms (the value of the resistor 201), the relay 210 becomes energized after a time delay T as described previously so as: (1) to energize a quick-acting operating relay 280 through a contact 210–c so as to add in the measuring resistor 270; (2) to lock in around the plate circuit of the thyratron 284 through a holding contact 210–d and a resistor 220; (3) to break the initial energization circuit as a contact 210–e opens after the contact 210–d; (4) to close a contact 210–f so as to energize the next control relay in the first chain after the time delay T (as indicated by an arrowhead); (5) to open a normally closed contact 210–a so as to preclude the energization of a solenoid 246 across a pair of A.C. terminals 297 and 298, which solenoid would be operated to indicate that the resistor 30 was below 17.96 ohms in the event that the thyratron 284 became conducting before the first control relay 210 was energized; and (6) to close a contact 210–b so as eventually to energize a solenoid similar to the solenoid 246 but associated with a later one of the operating relays in the first chain in the manner previously described.

It should be noted that the selector relays 130 to 133 and directing relays 140 to 143 and 150 to 153 illustrated in the first embodiment of the invention have been omitted for simplicity, and that the control relays beginning with 210 are illustrated as operating the solenoids beginning with 246 directly. A group of twenty-four operating solenoids are provided, twelve of which correspond to the possible gross steps and twelve of which correspond to the possible fine steps. The twenty-four solenoids, together, are effective to operate any suitable distributing mechanism that is capable of operation in the required number of different ways.

The distributing mechanism 11 described in the first embodiment of the invention is not easily adaptable to handle such a large number of categories; however, suitable mechanisms therefor are disclosed in applicant's related copending application Serial No. 24,710, filed April 26, 1960.

According to that application, an indexible grid is provided having a group of apertures corresponding to the total number of resistance categories. The grid is arranged for stepwise movement in each of two mutually perpendicular directions so that any one of the apertures in the grid may be positioned in alignment with a resistor-feeding tube so as to distribute the tested resistor to an associated receiving location or container. With that apparatus, the operating solenoids beginning with 246 and associated with the gross testing system would be effective to move the grid through a correlated number of steps (from one to twelve) in one of the co-ordinate directions of movement, while a group of operating solenoids beginning with 346 and associated with the fine testing circuit would be effective to move the grid from one to twelve steps in the other co-ordinate direction.

The operating relays beginning with 210 in the first group operate in chain fashion as previously described until such time as the terminal R passes from negative to positive, as illustrated in FIG. 8, and then the thyratron 284 becomes conducting so as to energize the sensing relay 209 and so as to preclude the energization of any additional control relays in the first chain. When the thyratron 284 becomes conducting, a first contact 209–a is closed so as to apply A.C. from the terminal 298 to the contactor 210–g of the first operating relay 210. As previously described, this circuit passes through the normally open b contact, such as 210–b, of every control relay in the first chain that is energized, and then through the normally closed a contact (such as 210–a) of the first control relay in the group which is non energized so as to energize that solenoid (such as 246) which is assoicated with the last control relay in the group to have been energized. Thus, the gross range of the resistor 30 has been determined and a solenoid has been energized to operate the distributing mechanism in accordance with that value.

The sensing relay 209 also closes a pair of contacts 209–c and 209–e so as to disconnect the grid 288 of the thyratron 284 from the terminal R' and to connect a grid 388 of a second thyratron 384 to the other output terminal P' of the amplifier 287, which corresponds to the other bridge output terminal P which is then negative since the terminal R has just shifted from negative to positive so as to fire the thyratron 284. The contact 209–c grounds the output terminal R' of the multiplier 287. In addition, the first sensing relay 209 closes a contact 209–b which is effective to complete the energization circuit for a first control relay 310 in the second chain through a connection 318 in the plate circuit of the thyratron 384 and a parallel connection of a resistor 308 and a second sensing relay 309.

The control relays beginning with 310 in the second group function precisely in the same manner previously described to add in the measuring resistors beginning with 370 in chain fashion until the bridge P—Q—R—S again passes through balance and fires the second thyratron 384 as viewed in FIG. 8. Thus, the control relay 310 energizes the quick-acting operating relay 380 through a contact 310–c after an initial time delay T, locks in through a contact 310–d and a resistor 320, breaks the initial energization circuit as a contact 310–e opens, completes an energization circuit for the next control relay through a contact 310–f, opens a contact 310–a which would otherwise energize a first solenoid 346, and closes a contact 310–b so as to energize a subsequent solenoid associated with that control relay in the second chain which is last to be operated when the thyratron 384 becomes conducting.

When the second thyratron 384 becomes conducting, a contact 309–a thereof is closed so as to energize an associated one of the operating solenoids (such as 346) in the second group in accordance with the fine category of resistance within the gross category set by the first phase of operation with respect to the arm Q—R. After both of the thyratrons 284 and 384 have been operated and the resistor 30 has been distributed to the proper receiving location, the switch f' is reopened and a subsequent resistor 30 is inserted in the arm P—Q and is tested in the same fashion.

The following operating times have been provided according to one specific apparatus according to the invention: each control relay in chain 1=0.006 second; the sensing relay 209=0.012 second; each control relay in chain 2=0.006 second; the sensing relay 309=0.012 second; and the operating solenoids such as 246 and 346=0.020 second. With this arrangement, the average testing time (six steps in each chain) is 0.116 second and the maximum testing time (twelve steps in each chain) is 0.188 second. Thus, it is apparent that a very rapid and efficient mechanism has been provided for automatically sorting a series of resistors into a large number of different categories.

The control circuit illustrated in FIG. 7 might also be utilized in other combinations where it is desired to sort into a number of categories a series of articles having at least one property that may be measured by stepwise comparative methods. As in the instant case, the sorting might be with respect to gross and fine categories relative to one property; or, in other cases, two or more different properties might be involved.

While various specific examples and embodiments of the invention have been described in detail hereinbefore, it will be obvious that various modifications may be made from the specific details described without departing from the spirit and scope of the invention.

What is claimed is:

1. In combination with an apparatus of the type wherein a group of operating devices is provided that are to be energized in sequence until the occurrence of a particular event that may occur as a result of the energization of any one of the operating devices, wherein a device is provided for detecting the occurrence of the event, and wherein an ultimate device is provided that is to be operated in one of several different manners in accordance with a determination of which operating device was effective to produce the event; a control circuit, which comprises a group of control relays, each of which is designed when energized for energizing an associated one of the operating devices, said control relays being arranged in an open chain such that each one but the last in the chain will energize a subsequent control relay after a distinct time delay T; means responsive to the operation of the detecting device when the particular event has occurred for precluding the energization of any control relay that is not already energized, said control relays being so constructed that the time delay T required to energize a subsequent control relay after the preceding one has been energized is longer than the time required for the operating device associated with the preceding control relay to be energized, plus the time required for the event to take place, plus the time required for the detecting device to determine whether or not the event has taken place, plus the time required for the energization-precluding means to function and thus prevent the energization of the subsequent control relay; and means responsive to the concomitant operation of the detecting device and at least one of said control relays for selectively operating the ultimate device in accordance with the number of control relays that have been energized.

2. The control circuit as recited in claim 1 wherein the detecting device comprises a thyratron so biased as to become conducting when the particular event occurs; wherein a D.C. source is provided for energizing said control relays; wherein the initial energization circuit for each control relay extends from the coil thereof to a connection in the plate circuit of said thyratron, thence to the positive terminal of said D.C. source; and wherein a holding circuit is provided for maintaining each control relay energized in parallel with the connection in the plate circuit of said thyratron; said thyratron and D.C. source being so constructed and arranged that when said thyratron is nonconducting there is sufficient positive potential available at the plate of said thyratron to energize said control relays, but so that when said thyratron becomes conducting there is insufficient positive potential available at the plate of said thyratron to energize any additional control relays.

3. In combination with a resistor-sorting apparatus of the type wherein a resistor is to be tested and then distributed to one of a group of receivers in accordance with the tested value of the resistance thereof, wherein the resistor is first connected in a first arm of a bridge circuit, wherein the resistance of a second arm of the bridge circuit is progressively varied in discrete steps so as to tend to balance the bridge, and wherein the output from the bridge circuit is impressed upon a detecting device that is designed to operate when the bridge output reaches a predetermined value indicating that the resistor under test has a resistance between known maximum and minimum limits; a control circuit, which comprises a group of control relays, each of which is designed when energized for varying the resistance in the second bridge arm by one discrete step, said control relays being arranged in an open chain such that each one but the last in the chain will energize a subsequent control relay after a distinct time delay T; means responsive to the operation of the detecting device when the bridge output reaches the predetermined value for precluding the energization of any control relay that is not already energized, said control relays being so constructed that the time delay T required to energize a subsequent control relay after the preceding one has been energized is longer than the time required for the preceding control relay to vary the resistance in the second bridge arm by the one step, plus the time required for the detecting device to determine whether or not the output from the bridge has reached the predetermined value, plus the time required for the energization-precluding means to function and thus prevent the energization of the subsequent control relay; and means responsive to the operation of the detecting device for distributing the tested resistor to a selected one of the receivers in accordance with the number of control relays which were energized when the detecting device was operated.

4. The control circuit as recited in claim 3 wherein each control relay is provided with a first normally open contact designed for varying the resistance in the second bridge arm of the bridge circuit by the one step when the control relay is energized, wherein each control relay but the last in the chain is provided with a second normally open contact that is connected in series with the coil of the next successive control relay in the chain so as to initially energize that control relay after the time delay T, and wherein means are provided for initially energizing the first control relay in the group after the resistor to be tested is connected in the first bridge arm and for de-energizing all control relays after the testing operation.

5. The control circuit as recited in claim 4 wherein the energization-precluding means is disposed in the initial energization circuit for each control relay; wherein each control relay is further provided with a third normally open contact that is connected in series with the coil thereof; and wherein a holding circuit is provided for each control relay, each holding circuit including the third contact of the associated control relay and paralleling that portion of the initial energization circuit which includes the energization-precluding means so as to maintain energized each control relay that has been energized prior to the operation of the energization-precluding means.

6. The control circuit as recited in claim 5 wherein the detecting device comprises a thyratron so biased as to become conducting when the output from the bridge circuit reaches the predetermined value; wherein a D.C. source is provided for energizing the control relays; wherein the initial energization circuit for each control relay extends from the coil thereof to a connection in the plate circuit of said thyratron, thence to the positive terminal of said D.C. source; and wherein the holding circuit through the third contact of each control relay parallels the connection of the initial energization circuit in the plate circuit of said thyratron; the bridge circuit, thyratron circuit, and D.C. source being so constructed and arranged that when said thyratron is nonconducting there is sufficient positive potential from the D.C. source available at the plate of said thyratron to energize the control relays, but so that when said thyratron becomes conducting there is insufficient positive potential available at the plate of said thyratron to energize any additional control relays.

7. The apparatus as recited in claim 6 wherein each control relay is provided with a pair of contacts of the make-before-break type, wherein the make contact is the third normally open contact that is disposed in the holding circuit for the associated control relay, and wherein the break contact is a normally closed contact that is disposed in the initial energization circuit for the associated control relay between the coil thereof and the connection in the plate circuit of the thyratron and is opened as a result of the closure of the make contact after the holding circuit has been completed so as to disconnect the associated control relay from the plate circuit of the thyratron at that time.

8. A control circuit, which comprises a thyratron; a group of control relays designed to be energized in chain fashion until the thyratron becomes conducting; a D.C. source capable of energizing the control relays; means for initially energizing a first control relay in the chain across said D.C. source; means responsive to the energization of each control relay but the last in the chain for energizing the next successive control relay in the chain across said D.C. source a predetermined time after the preceding control relay has been energized; a group of normally closed contacts associated one with each control relay, the initial energization circuit for each control relay extending from the coil thereof through the normally closed contact associated therewith to a connection in the plate circuit of said thyratron, thence to the positive terminal of said D.C. source, said thyratron and D.C. source being so constructed and arranged that when said thyratron is nonconducting there is sufficient positive potential from said D.C. source available at the plate of said thyratron to energize said control relays, but so that when said thyratron becomes conducting there is insufficient positive potential available at the plate of said thyratron to energize any control relays that are not already energized at the time when said thyratron becomes conducting; a group of normally open contacts associated one with each control relay; a group of holding circuits associated one with each control relay; each holding circuit including the normally open contact of the associated control relay and paralleling that portion of the initial energization circuit which is connected in the plate circuit of said thyratron so as to maintain the associated control relay energized even though said thyratron becomes conducting, each normally open contact and normally closed contact constituting a make-before-break pair where the normally open contact closes to complete the holding circuit before the normally closed contact opens to break the initial energization circuit.

9. The control circuit as recited in claim 7 wherein a group of quick-acting operating relays are provided, each operating relay being energized through the first contact of an associated control relay when that control relay is energized; wherein each operating relay is provided with a contact designed for varying the resistance in the second ratio arm of the bridge circuit by the one step when the operating relay is energized; wherein the energization time for said operating relays is of the order of 2 to 4 milliseconds; and wherein the operating time for the control relays constitutes the time delay T, T being at least sufficiently long after the energization of a preceding operating relay to permit the thyratron to become conducting and thus preclude the energization of a subsequent control relay and being within a range of the order of from 3 to 6 milliseconds longer than the energization time of the operating relays.

10. The control circuit as recited in claim 3 wherein a mechanism is provided for distributing the tested resistor to any one of the receivers; wherein a group of directing relays is provided, associated one with each control relay, for selectively operating said distributing mechanism; wherein a power source is provided for energizing said directing relays; wherein a normally open sensing contact is closed by the detecting device when the bridge output reaches the predetermined value; wherein each control relay is provided with a double contact, which includes a swinging contactor that engages a normally closed contact when the control relay is de-energized and engages a normally open contact when the control relay is energized; wherein the normally open contact of each control relay but the last in the chain is connected is series with the contactor of the next successive control relay; wherein the contactor of the first control relay in the chain is connected to the power source through the normally open sensing contact associated with the detecting device; wherein the normally closed contact of each control relay but the first in the chain is connected in series with the coil of the directing relay associated with the next preceding control relay; and wherein the normally open contact of the last control relay in the chain is connected in series with the coil of the directing relay associated therewith; whereby each directing relay will be energized only when the associated control relay was the last to be energized when the detecting device operated, so that the tested resistor will be distributed to that receiver which corresponds to the measured maximum and minimum limits thereof.

11. The control circuit as recited in claim 10 wherein an additional receiver is provided, wherein the distributing mechanism is so constructed and arranged that the resistor will be distributed to said additional receiver in the event that none of the directing relays is energized, and wherein the normally closed contact of the first control relay in the chain is not connected; whereby (1) when the first control relay is not energized indicating that the tested resistor is without the range of the bridge in one sense and (2) when all of the control relays operate and the detecting device does not operate indicating that the tested resistor is without the range of the bridge in the opposite sense, none of the directing relays will be energized and the resistor will be distributed to said additional receiver.

12. The control circuit as recited in claim 10 wherein the detecting device comprises a thyratron so biased as to become conducting when the output from the bridge circuit reaches the predetermined value, and wherein a sensing relay is connected in the plate circuit of said thyratron so as to become energized when said thyratron becomes conducting, said sensing relay being designed when energized for closing the normally open sensing contact so as to permit energization of the directing relays.

13. Apparatus for testing a series of resistors and then distributing the tested resistors into a group of receivers in accordance with the tested resistance values thereof, which comprises a bridge circuit having a first arm in which the resistors to be tested are connected one at a time; a thyratron connected to the output of the bridge circuit and so biased as to become conducting when the bridge circuit passes through balance; a group of measuring resistors arranged for selective inclusion into a second arm of said bridge circuit; a group of control relays associated one with each measuring resistor so as when energized to add the associated resistor into the second bridge arm, said control relays being arranged in an open chain such that each one but the last in the chain will energize a subsequent control relay after a distinct time relay T; means for energizing the first control relay in the chain after each resistor to be tested has been connected in the first bridge arm; means responsive to the conduction of said thyratron for precluding the energization of any control relay that is not already energized, said control relays being so constructed that the time delay T required to energize a subsequent control relay after a preceding one has been energized is longer than the time required for the preceding control relay to add the associated measuring resistor into the second bridge arm, plus the time required for the thyratron to become conducting, plus the time required for the energization-precluding means to function and thus prevent the energization of the subsequent control relay; means responsive to the energization of at least one of said control relays and the conduction of said thyratron for distributing each tested resistor into a selected one of the receivers in accordance with the number of control relays which are energized when the thyratron becomes conducting; and means for de-energizing all of said control relays after the testing operation has been completed and prior to the time that the next resistor in the series is inserted into the first bridge arm.

14. The apparatus as recited in claim 13, wherein each control relay is provided with a first normally open contact; wherein a group of quick-acting operating relays are provided for adding the measuring resistors into the second bridge arm, each operating relay being energized through the first contact of an associated control relay when that control relay is energized; wherein each control relay but the last in the chain is provided with a second normally open contact that is connected in series with the next successive control relay in the chain; wherein a D.C. source is provided for energizing the control relays; wherein the initial energization circuit for each control relay extends from the coil thereof to a connection in the plate circuit of the thyratron, thence to the positive terminal of the D.C. source, the control relays being energizable when the thyratron is nonconducting but not when the thyratron becomes conducting; wherein each control relay is further provided with a third normally open contact that is connected in series with the coil thereof so as to maintain the relay energized in parallel with the initial energization circuit through the plate circuit of the thyratron; wherein the operating time for each control relay is sufficiently long to allow the preceding operating relay to operate and the thyratron to become conducting to thus preclude the energization of any additional control relays; wherein a sensing relay is connected in the plate circuit of the thyratron so as to become energized when the thyratron becomes conducting, said sensing relay having a normally open contact; wherein a group of directing relays is provided, each of which is associated with a corresponding one of the control relays and is designed for selectively operating the distributing means so as to distribute a tested resistor to a corresponding one of the receivers; wherein a power source is provided for energizing said directing relays; wherein each control relay is further provided with a double contact, which includes a swinging contactor that engages a fourth normally open contact when the control relay is energized and a normally closed contact when the control relay is de-energized; wherein the fourth normally open contact of each control relay but the last one in the chain is connected in series with the contactor of the next successive control relay; wherein the contactor of the first control relay in the chain is connected to the power source for said directing relays through the normally open contact of said sensing relay; wherein the normally closed contact of each control relay but the first in the chain is connected in series with the coil of the directing relay associated with the next preceding control relay; and wherein the normally open contact of the last control relay in the chain is connected in series with the coil of the directing relay associated therewith.

15. In combination with a cyclically operative apparatus of the type wherein a group of operating devices is provided that are to be energized in sequence during a first cycle until the occurrence of a particular event that may occur as a result of the energization of any one of the operating devices, wherein a device is provided for detecting the occurrence of the event during the first cycle, and wherein an ultimate device is provided that is to be operated $n$ cycles after the first cycle in one of several different manners in accordance with a determination of which operating device was effective during the first cycle to produce the event; a control circuit, which comprises a group of control relays, each of which is designed when energized for energizing an associated one of the operating devices, said control relays being arranged in an open chain such that each one but the last in the chain will energize a subsequent control relay; means for energizing the first control relay in the chain near the beginning of the first cycle and for de-energizing all control relays near the end of the first cycle; means, responsive to the operation of the detecting device when the particular event has occurred, for precluding the energization of any control relay that is not already energized; $n+1$ selector means, each of which is capable of response to the concomitant operation of the detecting device and at least one of said control relays for storing information with respect to the number of control relays that were operated during the first cycle; switching means for permitting the operation of only one selector means to store information at any one time and for alternating the permitted group in progressive succession at approximately the start of each cycle; and means operable $n$ cycles after the first cycle for actuating each selector means to release the information stored thereby, each selector means then operating the ultimate device in accordance with the number of control relays that were operated during the first cycle.

16. Apparatus for sorting resistors, which comprises a device for testing a series of resistors to determine whether or not each resistor falls within one of a group of resistance categories having maximum and minimum resistance limits; a group of receivers corresponding one to each resistance category; a mechanism capable of distributing the tested resistors to any one of the receivers; a transfer device for carrying a plurality of resistors in spaced relationship; means for cyclically indexing said transfer device so that each resistor in the series stops adjacent to the testing device during a first cycle and, $n$ cycles later, stops adjacent to the distributing mechanism; $n+1$ groups of selector relays, one of the selector relays in each group being associated with a corresponding one of the resistance categories; switching means for permitting the energization of selector relays in only one group at any one time and for alternating the permitted group in progressive succession each time said transfer device indexes; means operated by the testing device during each cycle in accordance with the determined category of the resistor then under test for energizing the associated one of the selector relays in that group which is then permitted to be energized by said switching means; and means, responsive to the energization of each selector relay during the testing cycle and operated $n$ cycles later when the tested resistor stops adjacent to the distributing mechanism, for operating the distributing mechanism so that each tested resistor in the series is distributed to that receiver which corresponds to the resistance category thereof.

17. The sorting apparatus recited in claim 16 wherein the recited switching means constitutes a first switch having $n+1$ contacts which are closed in alternate succession by the indexing means near the start of each cycle and remain closed until near the end of the cycle, each contact of said first switch being connected in the energization circuit of every selector relay in an associated one of the groups; wherein $n+1$ second switches are provided associated one with each group of selector relays and cyclically operated by the indexing means so that each second switch is closed near the beginning of each testing cycle involving the associated group of selector relays and is not reopened until near the end of the first cycle after the $n$th subsequent cycle; wherein each selector relay in each group is provided with a normally open holding contact that is connected in series with the coil thereof and in series with the associated second switch to maintain each selector relay energized from the time that it is initially energized during the testing cycle until near the end of the first cycle after the $n$th subsequent cycle; wherein a third switch is provided which is cyclically operated by the indexing means so as to de-energize the testing device and the means operated thereby for initially energizing the selector relays near the end of each cycle and for re-energizing the detecting device near the start of the next cycle; wherein each selector relay is provided with a second normally open contact; wherein $n+1$ fourth switches are provided associated one with each group of selector relays and cyclically operated by the indexing means so that each fourth switch is closed near the beginning of the first cycle after the $n$th subsequent cycle; wherein a group of solenoids is provided for selectively operating the distributing mechanism so as to distribute the next successive receiver to an associated receiver; and wherein $n+1$ parallel energization circuits are provided for each solenoid, each passing in series through the second contact of an associated selector relay and the associated fourth switch.

18. The sorting apparatus as recited in claim 16, wherein the testing position is one step prior to the distributing position, and wherein means are provided for holding the distributing mechanism operated in a particular manner whenever two successive resistors in the series are to be distributed to the same receiver.

19. The sorting apparatus as recited in claim 17 wherein the testing position is one step prior to the distributing position; wherein a group of holding relays is provided, associated one with each solenoid; wherein each selector relay is provided with a third normally open contact, the energization circuit for each holding relay passing in series through a third contact of an associated selector relay in each group; wherein the closure interval for the second switches overlaps; wherein each holding relay is provided with a normally open, slow-release contact that is connected so as to energize the associated solenoid in parallel with the energization circuits through the second contacts of the selector relays; and wherein the slow-release contact does not reopen between the time that the first-energized selector relay is de-energized by the associated fourth switch and the time that an alternative energization circuit for the solenoid is re-established upon the closure of the fourth switch associated with the later-energized selector relay, whereby the solenoid is maintained energized to hold the distributing mechanism operated in a particular manner whenever two successive resistors in the series are to be distributed to the same receiver.

20. The sorting apparatus as recited in claim 17 wherein the transfer device comprises a rotary wheel of nonconducting material having a plurality of resistor-receiving seats at equally spaced intervals around the periphery thereof; wherein the indexing means comprises a drive motor, a drive shaft, and a Geneva drive driven from said drive shaft; wherein a cam shaft is driven from said drive shaft in predetermined synchronism therewith; and wherein a plurality of cams are mounted on said cam shaft and are so constructed and disposed as to operate the switches in the proper timed relationship.

21. Apparatus for sorting resistors, which comprises a bridge circuit having a first arm in which the resistors to be tested are connected one at a time; a thyratron connected to the output of the bridge circuit and so biased as to become conducting when the bridge circuit passes through balance; a group of measuring resistors arranged for selective inclusion into a second arm of said bridge circuit; a group of receivers; a mechanism capable of distributing the tested resistors to any one of the receivers; a transfer device for carrying a plurality of resistors in spaced relationship; means for cyclically indexing said transfer device so that each resistor in the series stops adjacent to the testing device during one cycle and stops adjacent to the distributing mechanism during the next cycle; a group of control relays associated one with each measuring resistor so as when energized to add that measuring resistor into the second bridge arm, said control relays being arranged in an open chain such that each one but the last in the chain will energize a subsequent control relay after a distinct time dely T; means for energizing the first control relay in the chain after each resistor to be tested has been connected in the first bridge arm; means responsive to the conduction of said thyratron for precluding the energization of any control relay that is not already energized, said control relays being so constructed that the time delay T required to energize a subsequent control relay after a preceding one has been energized is longer than the time required for the preceding control relay to add the associated measuring resistor into the second bridge arm, plus the time required for the thyratron to become conducting, plus the time required for the energization precluding means to function and thus prevent the energization of the subsequent control relay; a sensing relay connected in the plate circuit of said thyratron so as to be energized when said thyratron becomes conducting; a group of directing relays associated one with each control relay and having a pair of normally open contacts; means responsive to the energization of said sensing relay and at least one of said control relays for energizing that directing relay which is associated with the last control relay to be energized; a pair of groups of selector relays, one of the selector relays in each group being associated with a corresponding one of the directing relays; switching means having a pair of contacts which are alternately closed each time said transfer device indexes, the energization circuit for each selector relay in one group passing in series through one contact of said switching means and one contact of the associated directing relay, the energization circuit for each selector relay in the other group passing in series through the other contact of said switching means and directing relay; and means, responsive to the energization of each selector relay during the testing cycle and operated one cycle later when the tested resistor stops adjacent to the distributing mechanism, for operating the distributing mechanism so that each tested resistor in the series is distributed to a selected one of the receivers in accordance with the number of control relays which were operated when that resistor was tested.

22. Apparatus for sorting into a number of categories a series of articles of the type having at least one property that may be measured by stepwise comparative methods, which comprises at least two individually operable comparing means, each comparing means being designed for determining which category of an associated group of different categories each article belongs, each comparing means being capable of producing a predetermined electrical signal after ascertaining the proper category; at least two groups of control relays, each of which is designed for operating an associated comparing means through a succession of comparing steps, the control relays in each group being arranged in an open chain such that each one but the last in that chain will energize a subsequent control relay in that chain; means for energizing a first control relay in a first chain after each article is in a position to be tested; at least two thyratrons associated one with each comparing means and control-relay group, each thyratron being so biased and so disposed with respect to the associated comparing means as to become conducting when that comparing means has produced the predetermined electrical signal; means responsive to the conduction of each thyratron for precluding the energization of any control relay in the associated chain that is not already energized; means responsive to the conduction of each thyratron but the last-operated one for energizing the first control relay in the chain associated with a subsequent thyratron to initiate a subsequent and different comparing operation; and means responsive to the conduction of the last-operated thyratron for distributing each article to an appropriate receiving location in accordance with the number of control relays which were energized in each chain when the associated thyratron became conducting.

23. Apparatus for sorting a series of resistors into a large number of categories $m \cdot n$ having known maximum and minimum resistance limits, which comprises a bridge circuit having a first arm into which the resistors to be tested are connected one at a time; a first thyratron having a grid connected to a first output terminal of the bridge circuit and so biased as to become conducting when that output terminal shifts from negative to positive; first varying means designed for varying the resistance in a second bridge arm through a maximum of $m$ gross discrete steps so as to tend to overbalance the bridge circuit; first precluding means, responsive to the conduction of said first thyratron when the bridge circuit passes through balance, for precluding further operation of said first varying means; a first sensing relay designed for energization by said first thyratron when it becomes conducting; a second thyratron; means operated by said first sensing relay for disconnecting the grid of said first thyratron from the first output terminal of said bridge circuit and for connecting the grid of said second thyratron to a second output terminal of said bridge circuit which is then negative; second varying means initiated into operation by said first sensing relay and designed for varying the resistance in a third bridge arm through a maximum of $n$ fine discrete steps within each gross range so as to tend to rebalance the bridge circuit; second precluding means, responsive to the conduction of said second thyratron when the bridge circuit again passes through balance, for precluding further operation of said second varying means; a second sensing relay designed for energization by said second thyratron when it becomes conducting; a group of $m \cdot n$ receivers associated one with each possible resistance category; and means, responsive to the energization of both of said sensing relays in accordance with the number of steps through which each of said first and second varying means was operated, for distributing each resistor in the series to that receiver which is associated with its resistance category.

24. The apparatus as recited in claim 23, wherein two distinct groups of control relays are provided, each control relay in a first group being designed when energized for varying the resistance in the second bridge arm by one of the gross discrete steps, each control relay in the second group being designed when energized for varying the resistance in the third bridge arm by one of the fine discrete steps, the control relays in each group being arranged in an open chain such that each but the last in the chain will energize a subsequent control relay in that chain after a distinct time delay T; wherein means are provided for energizing the first control relay in the first chain after each resistor to be tested has been connected in the first bridge arm; wherein the first precluding means operates to preclude the energization of any control relay in the first chain that is not already energized when the first thyratron becomes conducting; wherein means are provided, responsive to the energization of the first sensing relay, for energizing the first conntrol relay in the second chain after the first thyratron has become conducting; wherein the second precluding means operates to preclude the energization of any control relay in the second chain that is not already energized when the second thyratron becomes conducting; said control relays being so constructed that the time delay T required to energize a subsequent control relay after a preceding one has been energized is longer than the time required for the preceding control relay to vary the resistance in the associated bridge arm by the one step, plus the time required for the thyratron to become conducting, plus the time required for the associated precluding means to function and thus prevent the energization of the subsequent control relay; and wherein means are provided for operating the distributing means in accordance with the number of control relays in each chain which were energized when the associated thyratron became conducting.

References Cited in the file of this patent

UNITED STATES PATENTS

| | | |
|---|---|---|
| 2,468,843 | Sunstein | May 3, 1949 |
| 2,566,767 | Hunt | Sept. 4, 1951 |
| 2,849,115 | Tooker | Aug. 26, 1958 |
| 2,901,685 | Alder | Aug. 25, 1959 |
| 2,946,950 | Zomber | July 26, 1960 |